United States Patent [19]
Metzler

[11] 3,797,427
[45] Mar. 19, 1974

[54] CIRCULAR EMBROIDERY-LACE ARTICLES

[76] Inventor: Othmar E. Metzler, Cliffside Park, N.J.

[22] Filed: May 5, 1972

[21] Appl. No.: 250,700

[52] U.S. Cl............................ 112/266, 87/2, 112/439
[51] Int. Cl.............................................. D05c 3/00
[58] Field of Search ........... 112/266, 413, 414, 415, 112/416, 439, 405, 436, 116; 2/243, 143, 133, 131, 129; 87/2, 4, 7; 139/385.5, 386, 421, 422; 66/169, 170, 190, 193, 192

[56] References Cited
UNITED STATES PATENTS

| | | | |
|---|---|---|---|
| 758,435 | 4/1904 | Gaisman | 139/421 |
| 1,391,943 | 9/1921 | Dinkelspiel | 87/2 |
| 1,563,990 | 12/1925 | Hulme | 139/386 X |
| 2,418,347 | 4/1947 | Haag | 112/414 X |
| 2,718,905 | 9/1955 | Moore | 139/421 |
| 2,845,834 | 8/1958 | Bloch | 87/2 |

Primary Examiner—James R. Boler
Attorney, Agent, or Firm—Samuelson & Jacob

[57] ABSTRACT

An embroidery-lace article in the form of an annular motif including an outer circumferential edge, an inner circumferential edge shorter than the outer circumferential edge and a relaxed elastic thread located adjacent the inner circumferential edge. The article is manufactured by embroidering the motif along an essentially straight line with the elastic thread pretensioned to the length of the outer circumferential edge and subsequently relaxing the elastic thread to enable contraction of the thread to draw the motif into a curved configuration.

9 Claims, 3 Drawing Figures

PATENTED MAR 19 1974  3,797,427

CIRCULAR EMBROIDERY-LACE ARTICLES

The invention pertains to a method for manufacturing circular embroidery-lace articles and to the articles themselves.

Circular embroidery-lace articles are used for collars and doilies. The usual methods for manufacturing collars and doilies are:

1. The articles are stitched in one piece with one needle; or
2. The articles are stitched in segments and joined into circles afterwards.

With respect to the first method; manufacturing the articles in one piece with one needle requires a big repeat, which results in a small yield for a relatively high stitch number, and concomitant long machine time. With the second method, the stitch number and repeat are lower, but assembly of the many segments with a concomitant number of joints becomes a time consuming operation.

The present invention makes it possible to manufacture collars and doilies and other circular lace articles on a machine along an essentially straight line, using the smallest repeat.

The present invention achieves this result by stitching what later will become a circular flowing motif in a stretched manner along an essentially straight line extending along a frame on the embroidering machine and inserting more or less pretensioned elastic threads in especially selected areas lengthwise into the embroidered lace. By taking the embroidered articles off the frame, the tensioned elastic threads are allowed to shrink back to their normal unstretched length. This results in curving of the articles ino the desired circular configuration. The elastic threads preferably are constructed of rubber. The use of shrinkable fibers is possible.

Following is a detailed description of an embodiment of the invention illustrated in the accompanying drawing, in which.

Figure 1:
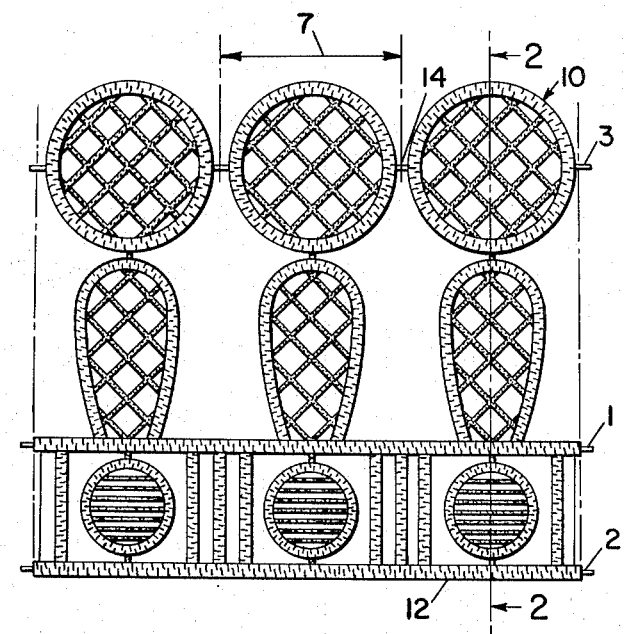
FIG. 1 is a front view of a portion of an article in the form of a doily being constructed in accordance with the invention.
Figure 2:
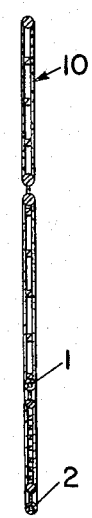
FIG. 2 is a cross-sectional view taken along line 2—2 of FIG. 1 showing the article while on the machine during construction.

Referring now to the drawing, and especially to FIGS. 1 and 2 thereof, tensioned elastic threads 1 and 2 have been incorporated within an embroidered motif which is a part of an article 10 in the form of a doily being embroidered in a machine (not shown) along an essentially straight line. The elastic threads 1 and 2 are located adjacent one longitudinal edge 12 of the motif.

Figure 3:
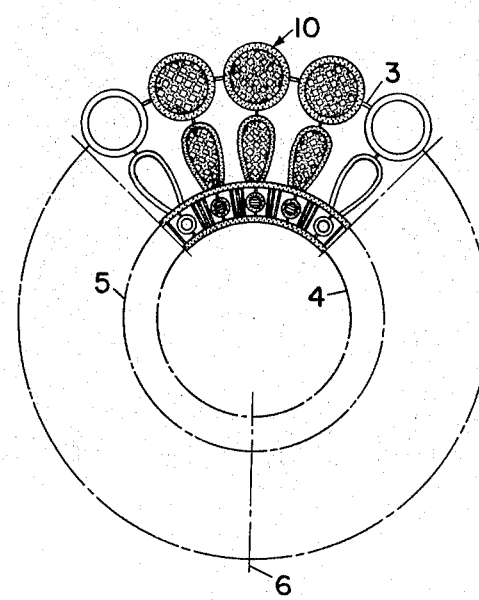
FIG. 3 illustrates a portion of a finished doily in full lines, with the remainder of the complete article illustrated in phantom.

Turning to FIG. 3, phantom circular outlines 4 and 5 show the curve formed by the same elastic threads 1 and 2 after the article 10 is taken off the machine.

The amount of curvature is controlled by placing more or less tension in the elastic threads 1 and 2 while article 10 is being embroidered in the straight line configuration. The elastic threads 1 and 2 are pretensioned on the machine in such a way that their relaxed length will correspond to the length of the corresponding circular outlines 4 and 5. The outer thread 3 joining each repeat 7 establishes the basic circle for the calculation of the percentage for pretensioning the elastic threads 1 and 2. The joining thread 3 is located so as to establish another longitudinal edge 14 opposite longitudinal edge 12.

As the embroidered article comes off the machine, the elastic threads 1 and 2 shrink back to their original length and form a curve with the emboridery to establish an annular article 10, as illustrated in FIG. 3. Thus, edge 12 will become the shorter inner circumferential edge of the completed article, while edge 14 becomes the longer outer circumferential edge thereof.

If the motif is separated into pieces, corresponding with the same length as that of joining thread 3 and the embroidery is then joined along line 6, a doily is constructed with only one joint compared to the usual manufacturing method which requires at least four joints. The present method also requires much less stitches.

The embodiments of the invention in which an exclusive property or privilege is claimed are defined as follows:

1. A method of manufacturing an embroidery-lace article in the form of an annular motif including an outer circumferential edge, and an inner circumferential edge shorter than the outer circumferential edge, said method comprising the steps of:

embroidering the motif along an essentially straight line corresponding in length generally to the length of the outer circumferential edge, said longitudinally extending motif having opposite longitudinal edges;

including in a selected location in said motif at least one longitudinal, pretensioned elastic thread, said selected location being adjacent one of said opposite longitudinal edges; and subsequently relaxing the elastic thread to enable said thread to contract said one of the opposite longitudinal edges relative to the other of said opposite longitudinal edges, whereby the embroidered motif will be drawn into a curved configuration with said one edge constituting the inner circumferential edge and said other edge constituting the outer circumferential edge of the annular motif.

2. The invention of claim 1 wherein the elastic thread extends along the entire length of the motif.

3. The invention of claim 1 wherein the elastic thread is included in said motif during embroidering.

4. The invention of claim 1 wherein the elastic thread is constructed of rubber.

5. The invention of claim 1 wherein a plurality of pretensioned elastic threads are included in selected locations in the motif.

6. An embroidery-lace article in the form of an annular motif including an outer circumferential edge, and an inner circumferential edge shorter than the outer circumferential edge, said article further including at least one relaxed elastic thread located adjacent the inner circumferential edge, said elastic thread being capable of elastic extension lengthwise by an amount sufficient to extend the inner circumferential edge to the same length as that of the outer circumferential edge.

7. The invention of claim 6 wherein the elastic thread extends along the entire length of the motif.

8. The invention of claim 6 wherein the elastic thread is constructed of rubber.

9. The invention of claim 6 wherein a plurality of pretensioned elastic threads are included in selected locations in the motif.

* * * * *